Patented Nov. 8, 1938

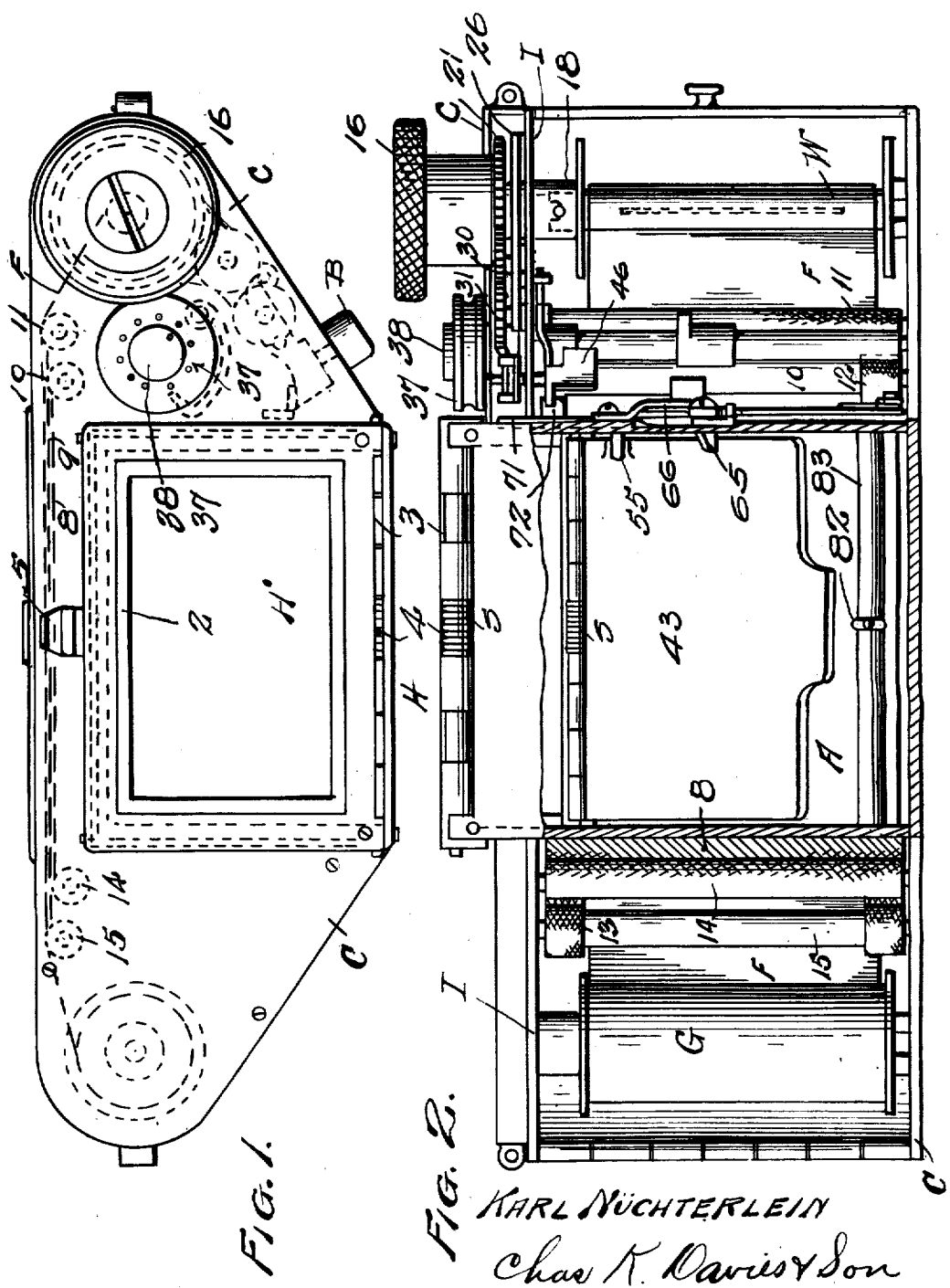

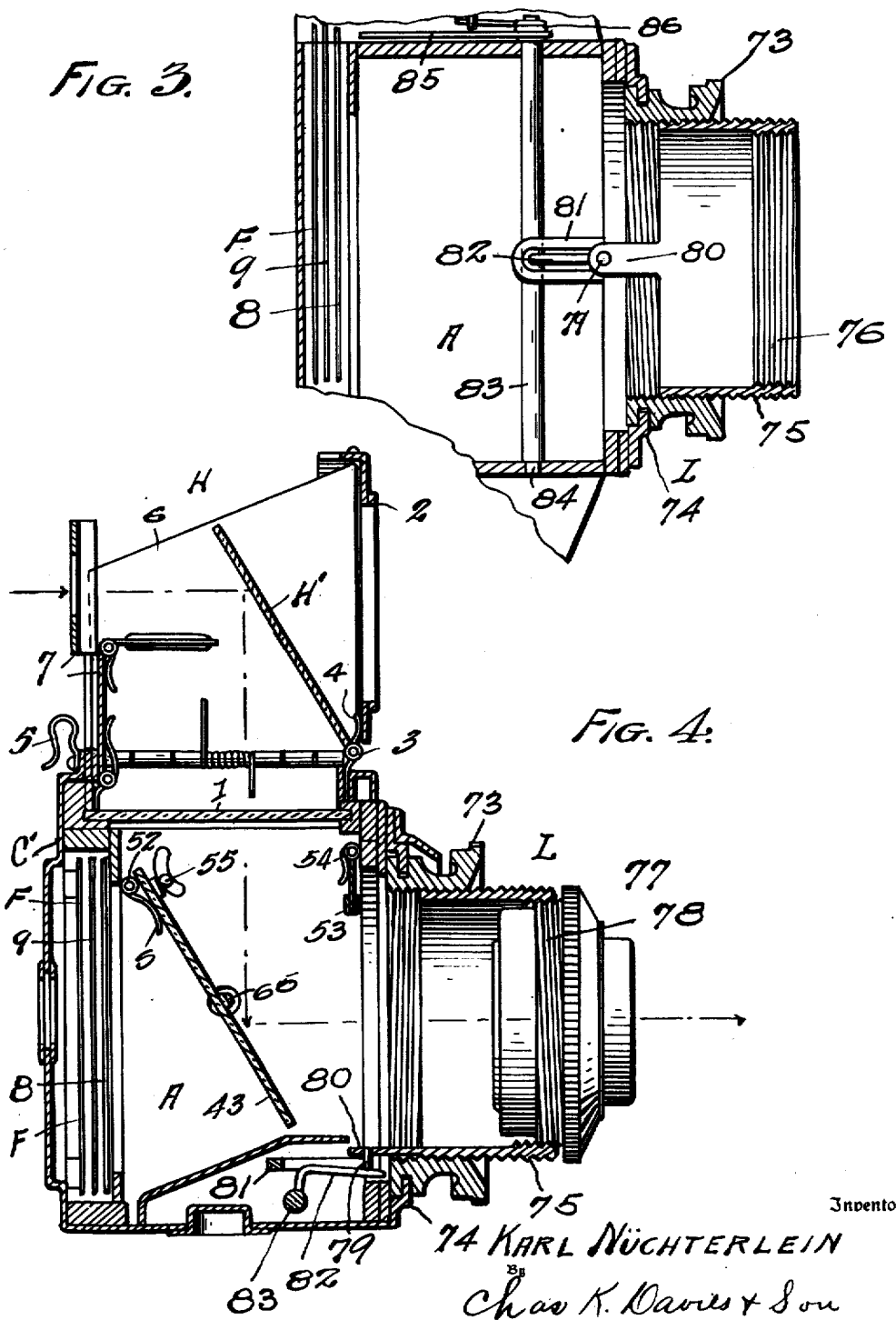

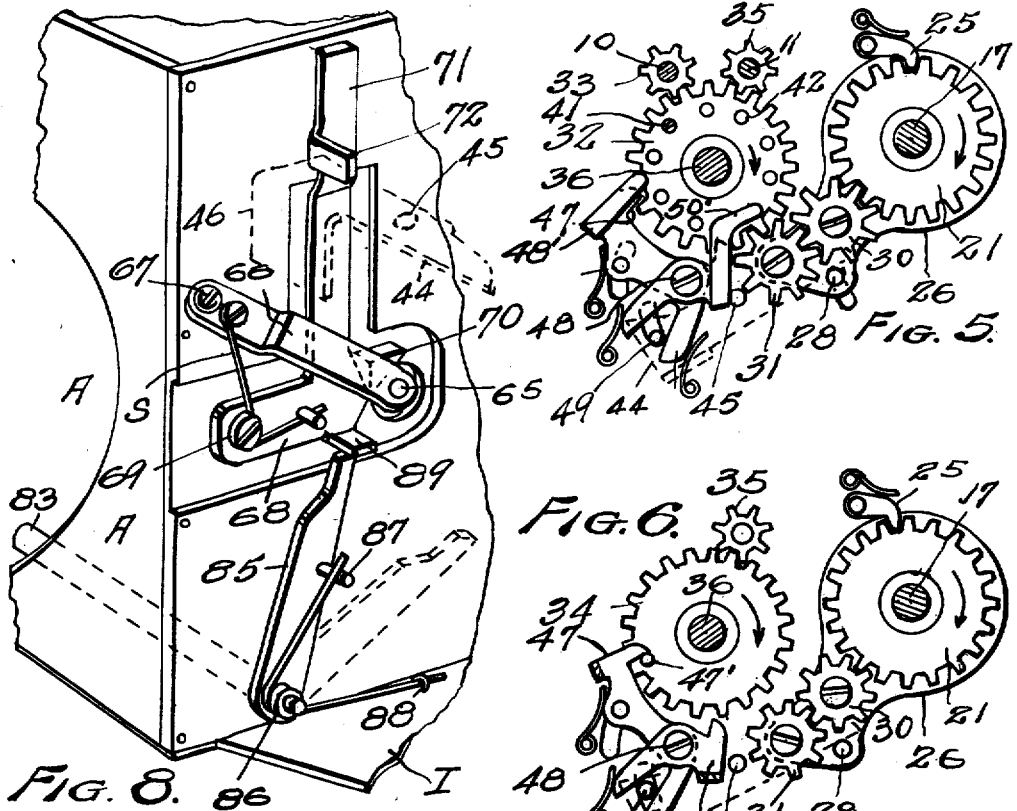
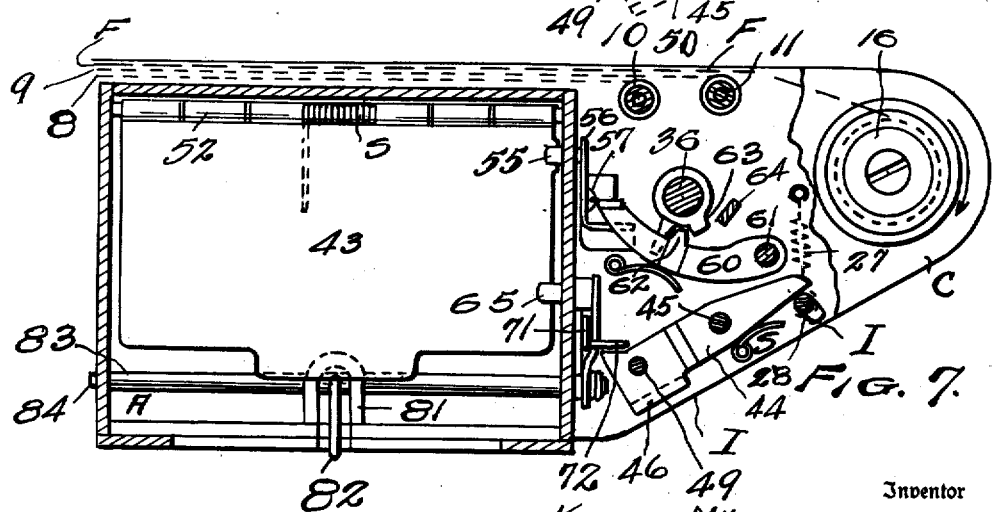

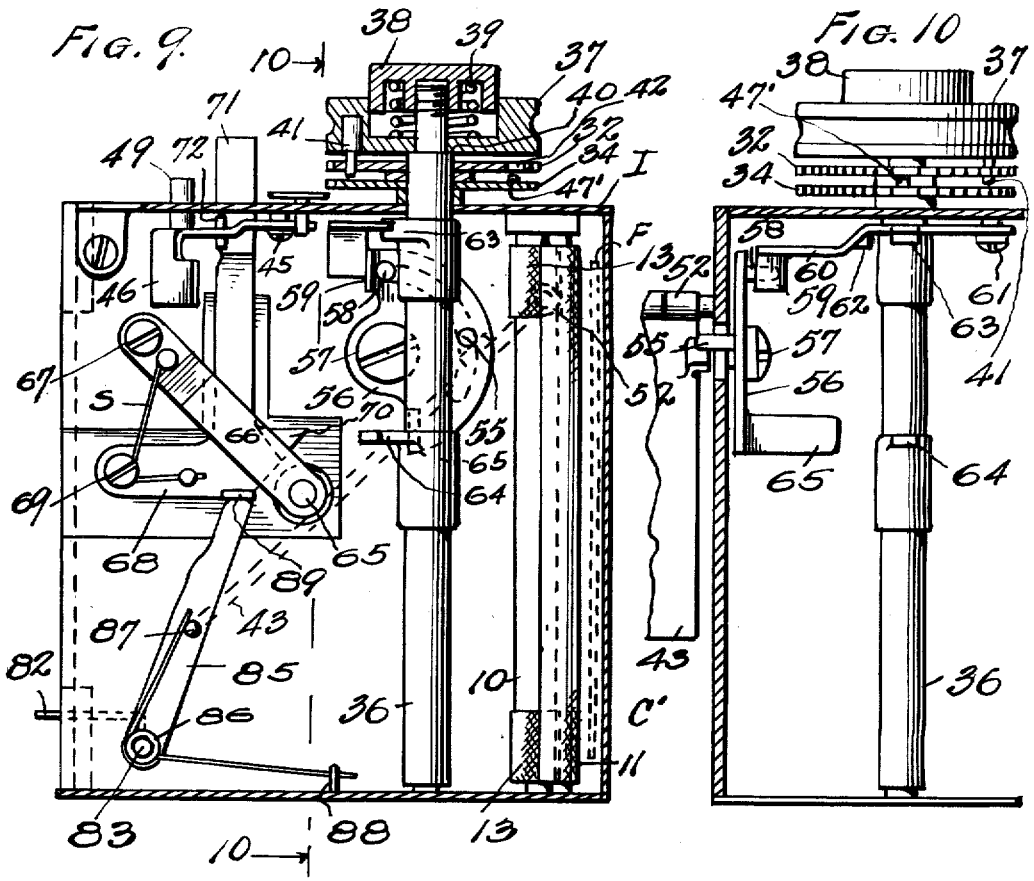

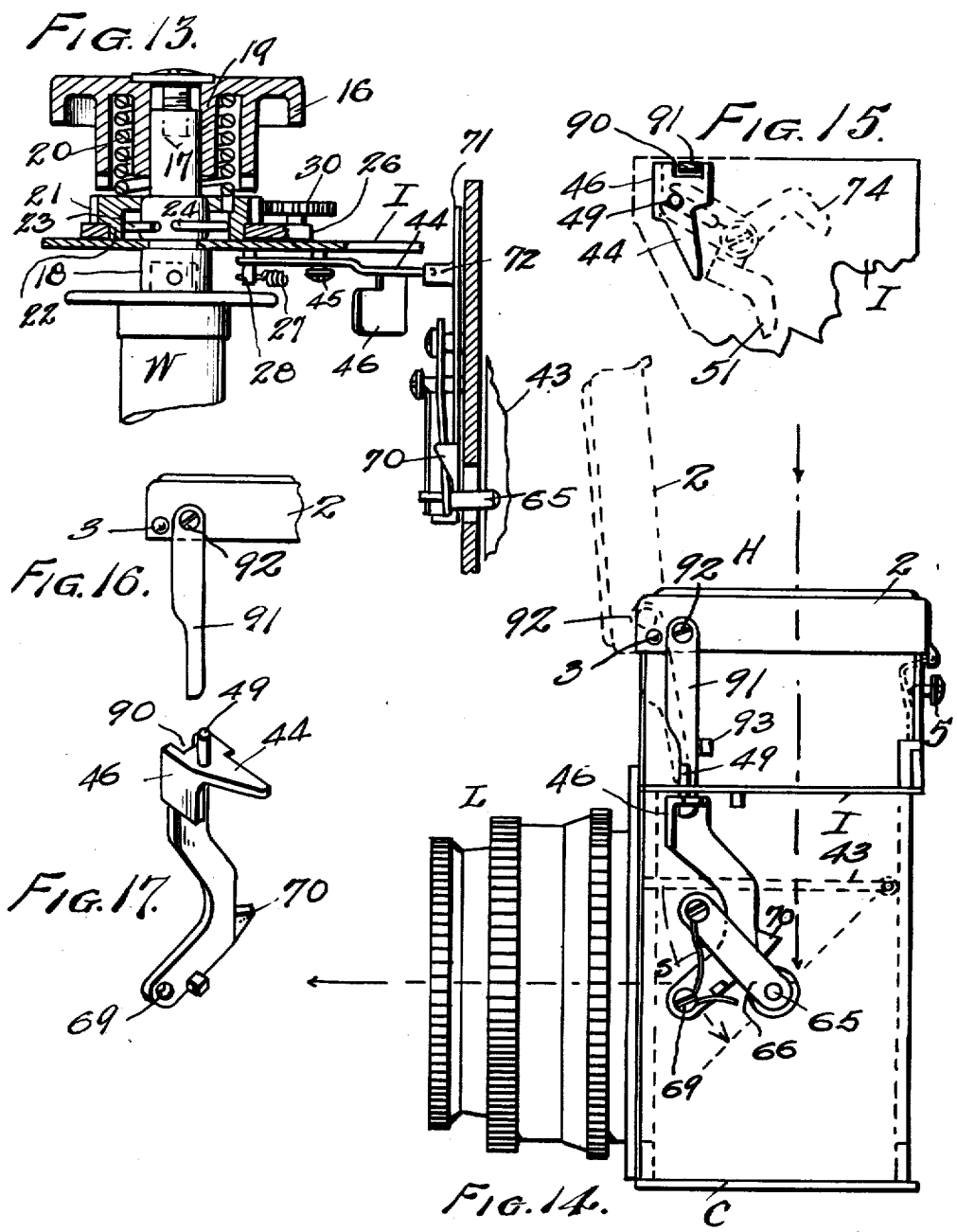

2,136,148

UNITED STATES PATENT OFFICE 2,136,148

REFLEX CAMERA

Karl Nüchterlein, Dresden, Germany, assignor to Ihagee Kamerawerk Steenbergen & Co., Dresden, Germany Application January 18, 1937, Serial No. 121,191

25 Claims. (Cl. 95—42)

The present invention relates to improvements in reflex cameras and particularly to a safety device or mechanism for control of the operating lever or member that is actuated by the usual push button, pneumatic bulb, or other device, in the taking of pictures. In illustrating my invention I have employed a reflex camera of the roll film type, in which two spring wound curtains form the shutter and are arranged directly in front of the light sensitized layer or surface of the film. A single operating knob is manually turned to feed the film roll and to automatically set the shutter operating mechanism, and also to swing a hinged focusing mirror located in the light chamber to non-picture taking position for use in focusing the camera. An operating lever is utilized to set in motion mechanism for releasing this hinged focusing mirror that it may automatically swing to picture-taking position and close the light chamber against the entrance of light rays. Directly after the release of the focusing mirror the shutter operating mechanism is released to permit automatic operation of the shutter to take the picture.

The safety device of my invention co-operates with the operating lever and the focusing mirror in the light chamber to prevent accidental or inadvertent taking of a picture or exposure of the film, and I provide means actuated by a focusing element of the camera for locking or latching the operating lever against movement and also for holding the focusing mirror in non-picture taking position.

The locking mechanism may be under control of an adjustable portion of the lens mount that is employed in focusing, when the lens is in non-focusing position, i. e. at any point before the lens is focused to infinity; or the safety device may be under control of another essential element of the camera, as the spring-unfolded focusing-hood which is mounted on the camera and provided with a reflecting mirror.

When the safety mechanism is controlled by a portion of the lens mount, the latter is mounted on the camera and manually projected forward or retracted rearwardly. When the lens is in its rearmost position, or non-focusing position the operating lever is held rigid against movement, and the usual control "button" is thereby held against depression and is inoperative. After the lens mount has been projected to picture-taking position, the operating lever is released in order that it may operate in the usual manner.

In a camera where the pressing of the "button" and movement of the operating lever for the focusing mirror and shutter mechanism is controlled by the position, of the foldable focusing hood, a picture cannot be taken, nor can the operating lever be actuated, until the focusing mirror is unfolded to reveal the image on the ground glass of the camera to the photographer. Thus, for instance, after the hood has been unfolded, an observation through the ground glass screen may disclose a blurred or non-focused image previously taken, and the photographer is thereby warned not to actuate the operating lever until he has fed the film the required distance to make a correct exposure.

In the accompanying drawings I have illustrated one complete example of the physical embodiment of my invention in a reflex camera, and a modification thereof, but it will be understood that changes and alterations may be made in these exemplifying structures within the scope of my claims, without departing from the principles of my invention.

In the accompanying drawings:

Figure 1 is a top plan view of a reflex camera in which my invention is embodied, the lens mount being omitted for convenience of illustration, and the focusing hood being shown in folded position.

Figure 2 is a view in front elevation of the interior of the camera, parts being broken away to disclose the hinged focusing mirror in the light chamber, parts of the light chamber being shown in section, and the front plates of the camera casing having been removed.

Figure 3 is a horizontal sectional view through the light chamber at the center of the camera, showing also the focusing ring and the bushing or carrier of the lens mount, together with a rock-shaft of the safety device and its connection to the lens carrier or bushing.

Figure 4 is a vertical transverse sectional view at the center of the camera with the focusing hood unfolded or open, the focusing mirror in focusing position, and the safety device in active position to prevent movement of the mirror.

Figure 5 is an enlarged detail plan view of the gearing for setting the camera, the parts being free to rotate, and Figure 6 is a similar view, showing one of the curtains of the shutter held against automatic winding.

Figure 7 is a detail plan view partly in horizontal section of the camera, showing the two detents for the focusing mirror, which is in non-picture-taking position, and its connections including the operating lever for releasing the mirror and the shutter.

Figure 8 is an enlarged perspective view showing the exterior of the light chamber-walls, together with the cam-arm for releasing the focusing mirror, and the pivoted safety-detent holding the cam-arm against movement.

Figure 9 is an enlarged exterior view of the light chamber showing the shutter setting mechanism, the means for automatically releasing the focusing mirror, and the safety device for said mirror-releasing means.

Figure 10 is a vertical sectional view, as at line 10—10 in Figure 9, showing a fragment of the focusing mirror, and also showing the time setting mechanism.

Figure 11 is a diagrammatic plan view showing the gear plate of the winding mechanism, the transmission pinions in dotted lines, and the shutter gear of the first curtain of the shutter with the detent therefor.

Figure 12 is a similar detail view of parts of the gearing for the second curtain of the shutter mechanism.

Figure 13 is a detail sectional view showing the winding knob and mechanism operated thereby.

Figure 14 is a detail transverse sectional view of a modified form of camera with one end-portion removed to illustrate an exterior face of the wall of the light chamber, showing also the lens mount, the unfolding hood and its depending pivoted latch for controlling movement of the operating lever, and showing the cover portion of the hood open in dotted lines.

Figure 15 is a view looking down on the operating lever of Figure 14, showing the latch in cross section.

Figure 16 is a perspective view showing the latch pivoted to the folding hood, and Figure 17 is a perspective view of the operating lever employed in this type of camera.

The camera is provided with an outside cover or casing C having the usual hinged back-wall C' which is openable to gain access to the interior of the camera for loading, and for removing the film F. The lens mount indicated as a whole by the letter L in Figure 4 is located at the front of the camera and exposures may be made by applying pressure to the "button" B in Figure 1, either manually, or by other suitable means, as usual.

A spring actuated-foldable, focusing hood is indicated in Figures 1, 4 and 14 as a whole by the letter H, the hood being closed in Figures 1, 2, and 14, and open for focusing in Figure 4. The hood, which is located on the top of the camera, above the interior light chamber A, and above the interior ground glass screen 1 which closes the light chamber, comprises a rectangular open center cover or lid 2 that is hinged at 3 on the casing of the camera, and a spring 4 automatically swings the cover to unfolded or open position when the latch 5 is released by pressure of the thumb or finger. In addition to this hinged cover, the hood includes two spring opened side walls 6, and a spring-opened rear wall 7, which may spring open after the cover 2 is released to open. A reflecting mirror H' is hinged in the hood with the cover 2, and this mirror, which is spring-opened, may be folded down with the side and rear walls, and retained by the folded cover 2 when the latter is latched in closed position.

The interior frame or frame plates for the operating parts of the camera are indicated by the letters I. The film roll F is unwound from the roll G and wound upon the winding spool W located exterior of the light chamber, at opposite sides thereof, and within the camera casing.

The shutter comprises two parallel curtains 8 and 9, which are designed to flash across the rear portion of the light chamber A for an exposure, while the film F remains stationary during the exposure, but the film is wound upon its spool W after each exposure, and during the setting of the camera for the next exposure.

Each curtain has one end attached to a shutter roller 10 or 11, and each curtain is provided with a pair of tapes 12, 13, the tapes 12 of the first curtain 8 being attached to the shutter roller 10, and the opposite end of this curtain is attached to an automatic, spring-round roller 14, which roller is journaled in the spaced frame plates I.

The second curtain 9 of the shutter is attached at one end to the roller 11, and its tapes 13 are attached to the spring-wound roller 15. By turning the knob 16, both curtains are wound upon the shutter rollers 10 and 11; when the shutter is released the curtain 10 first starts to wind upon its automatically operating roller 14, exposing an opening between its tapes in front of the film; and then the second curtain follows to close the exposure-opening, and this second curtain is automatically wound upon its roller 15.

The film spool W is simultaneously turned by the hand knob with the shutter rollers 10 and 11 to feed the film or wind it on the spool, as the curtains are unwound from their automatic spring-wound rollers 14 and 15 and wound on rollers 10 and 11, and the turning of the knob also winds a spring motor of the timing mechanism.

As best seen in Figure 13 the knob 16 is fixed, as by a screw, to the short stub shaft 17 which is journaled to turn in a bearing in one of the frame plates I, and the end of this winding shaft terminates in a socket head 18 to receive a pin of the film spool W, so that the knob, shaft, and spool turn together.

In addition to this simultaneous winding of the film and the shutter, it will be apparent that the spool W must also be turned beyond the required movement for winding the shutter. Provision is made for this independent turning of the knob and winding of the film on the spool beyond the set position of the shutter, by the interior construction and arrangement of the winding knob, which includes a friction coupling between the knob and the shaft and transmission gears or pinions to the shutter rollers. The knob is fashioned with a spaced inner sleeve 19, and a spring 20 is coiled about the sleeve with one end anchored to the knob and the other end fixed in a hole in a main drive gear 21 of the transmission mechanism to the shutter rollers. The main drive gear is mounted concentrically with the shaft and is loose thereon, and this gear is fashioned with an annular skirt 22 forming a recess in which a friction or brake-spring 23 is seated, said spring having a coil in frictional contact with the skirt 22 or wall of the recess, and having one end, as 24, extending transversely through an opening and fixed in the shaft 17.

Reverse movement of the drive gear is prevented by the usual spring pressed pawl 25, which permits clockwise movement of the knob but prevents anti-clockwise movement of the knob. A gear plate 26 has an annular portion mounted concentrically with and surrounds the reduced skirt of the main drive gear, and this plate is capable of oscillation with the skirt as an axis or center for swinging the transmission gears or pinions into and out of operative positions. The plate is located at the upper side of a slotted frame plate I, and a spring 27 is supported beneath the frame plate and attached to a pin 28 fixed to the gear plate and to another pin fixed at the underside of the frame plate, so that the spring tends to pull the gear plate and its transmission pinions into engagement with the shutter winding mechanism and to permit the disengagement of the pinions upon actuation of the button B.

Two meshed transmission pinions 30 and 31 are journaled in bearings on the upper surface of the oscillatable gear plate 26, the pinion 30 being constantly meshed with the main drive gear 21, and also constantly in mesh with its companion pinion 31. By means of the oscillatable gear plate, the pinion 31 is alternately engaged with and disengaged from the large shutter setting gear 32 that meshes with the pinion 33 on the roller 10 of the curtain 8 of the shutter.

A second shutter setting gear 34, concentric with gear 32 meshes constantly with the shutter pinion 35 on the roller 11 of the number two curtain of the shutter, and both of these shutter setting gears are mounted rigidly on the gear shaft 36 that is arranged in parallelism with the shutter rollers and journaled in bearings in spaced frame plates I. The upper end of the gear shaft projects above the camera casing, but the two gears 32 and 34, and the pinions, are located beneath the top plates of the camera casing.

As seen in Figure 1 a shutter setting dial or ring 37 in the form of a hollow, circular disk, is loosely mounted to slide vertically and to turn on the upper projecting end of the gear shaft 36, and the upper exposed face of this disk bears nine dots indicating the variations in the times of exposure, in fractions of seconds, for short time or high speed releasing of the shutter, and for longer time or slow exposure of the shutter. These nine dots are co-ordinated with a single relatively stationary dot on the cap 38 that is screwed on the upper end of the gear shaft and fixed in predetermined position with relation to the surrounding disk or dial ring 37. The disk which forms the dial ring has an annular recess in its upper face to accommodate the cap, and the latter is also recessed, at its underside, to enclose a coiled spring 39 that is interposed between the cap and the bottom of the recessed disk. The spring thus tends to hold the loose dial ring or disk down upon a shoulder 40 fashioned just below the upper threaded end of the gear shaft 36, but the disk may be lifted by hand against tension of the spring, and turned on the shaft as a center and about the cap, to set the time of exposure as indicated by the relation of the single dot on the cap to one of the nine dots on the dial ring. Thus a selected one of the nine dots is brought into alinement with the single dot as indicated in Figure 1 for a selected time exposure.

A single timing pin 41 is fixed in the underside of the disk to project downwardly therefrom and this pin is adapted to register with and be inserted in a selected one of a complementary annular series of nine holes 42 in the upper face of the shutter gear 32, as seen in Figures 5 and 11, and these holes correspond to the nine dots on the dial ring. By manipulating the dial ring the pin 41 is caused to enter one of the holes 42 and be held therein by the tension of the spring 39 for the purpose of coupling together the dial ring 37 and the first-shutter roller 32 which meshes with the pinion 33 of the roller 10.

After the dial ring has thus been adjusted for the time exposure, the camera is set by turning the knob 16 against the tension of the two automatic spring-wound rollers 14 and 15 of the shutter curtains; and the two rollers are held against turning automatically, by the engagement of the main gear 21, pinions 30, 31, and shutter gear 32, as indicated in Figure 5.

To release the automatically-winding curtain rollers, and the gear shaft 36, and also to release the automatically swinging focusing mirror 43 before these curtain rollers are released, that is, to release the focusing mirror and permit it to automatically swing from focusing position to picture-taking position before the shutter operates for an exposure, the pinion 31 is withdrawn from engagement with the shutter gear 32, by means of swinging movement of the gear plate 26 from position of Figure 5 to position of Figure 6.

This gear plate is swung by action of a pivoted operating lever 44, which is also instrumental in releasing the focusing mirror 43, and the lever is pivoted at 45 at the underside of an upper frame plate I. The lever is fashioned with a flange 46, which is located in position to be pressed against by the "button" B, or the flange may be pressed through pneumatic action or in other usual manner.

The operating lever 44 is held by its spring S with one of its ends bearing against the operating pin 28 depending from the gear plate 26, and the other end of the operating lever is in position to engage the release device of the focusing mirror 43, and it is obvious that pressure against the flange 46 will swing the lever on its pivot 45 and cause the gear plate to swing on its pivot to disengage pinion 31 from the shutter gear 32.

To thus release the shutter mechanism for a short time exposure, snapshot, or bulb exposure, only a single push is applied to the flange 46 of the operating lever; but when the dial ring is set for a time exposure, two successive pushes or pressures are applied to the operating lever.

The initial or first of these two pressures against the operating lever results in release of the #1 curtain of the shutter which is designated 8, and this curtain is immediately wound upon the automatic winding spool or roller 14; and the second pressure applied to the operating lever 44 releases curtain #2, which is designated 9, and this curtain is immediately wound, automatically, upon the automatically winding roller 15, to close the shutter.

It will be understood that the curtains, when making the exposure, flash in a direction opposite to the direction of movement of the film F, when the latter is being wound upon its spool W and the opening through the curtains caused by the presence of the curtain-tapes 12 and 13, exposes a portion of the film to the light coming through the lens into the chamber A.

When making a time exposure, on the first movement of the operating lever 44, the shutter gear 34 of the #2 curtain is locked and held by means of a spring detent 47 (Figures 5-6) which is pivoted at 48 on one of the plates I, and movement of this detent is limited and guided by a pin and slot arrangement in the plate I. This detent is held in disengaged position by means of a push pin 49 fixed on the upper face of the operating lever 44 and projecting through a slot in the plate I. As the pin 49 moves with the pressed lever, the spring-detent 47 is released and it automatically moves into the path of a stub pin 47' fixed on the top of the lower shutter gear 34 for the #2 curtain designated 9, and stops the movement of this gear.

A second spring-detent 50 is also pivoted on the pin or screw 48, at the opposite side of the push pin 49 of the operating lever, for engagement with the shutter gear 34 of the #2 curtain, and these two detents, together with their respective cam arms 48' and 50', form an escapement for the shutter gear 34 in connection with pin 47', one detent being engaged while the other detent is disengaged.

On the second pressure against lever 44 for the time exposure, the detent 47 is already disengaged from pin 47', and the detent 50 again moves to engage the teeth of gear 34, but the interval of time required for this movement prevents detent 47 from engaging pin 47', which pin escapes the detent, and the gear 34 is free to revolve. The automatic spring wound roller 11 is then free to wind the #2 curtain, as 9, to close the exposure.

For an instantaneous exposure say ⅕₂₅ to ¹⁄₁₀₀₀ of a second, the dial ring 37 is set to the desired speed, and upon pressure against the operating lever 44, the detent 47 moves into the path of the stub pin 47' to retain gear 34, which gear has previously been released by disengagement of the detent 50 from gear 34.

Dial pin 41 now moves in an arc in the same direction as that of the stub pin 47' but behind the stub pin, and the stub pin 47' is thus retained by detent 47 until pin 41 reaches the cam arm 48' which is rigidly mounted on detent 47. The dial pin 41 then forces the cam detent 48' out of its path thereby disengaging detent 47 from the stub pin 47' and also permitting the gear 34 to revolve, releasing curtain #2 so that it may be wound on its automatic roller.

As above stated, pin 41 follows stub pin 47', and the time elapsing between the arrival of the stub pin 47' at detent 47 and the arrival of dial pin 41 at cam detent 48' fixes the time of the exposure. The greater the distance the dial pin 41 is removed and the greater its travel, the longer the exposure.

For a bulb exposure, the dial pin 41 is moved to the designated position, and when the operating lever is pressed by the photographer, and retained in depressed position, detent 47 moves into the path of the stub pin 47', and the dial pin 41 follows stub pin 47'. Stub pin 47' is thus retained by detent 47 and pin 41 reaches the limit of its movement and is stopped before contact with the cam detent 48' at a point in the path of the cam detent 50, thus preventing detent 50 from engaging and retaining gear 34. Thus the #2 curtain is retained solely by the detent 47 in engagement with the pin 47', and when the operator releases the operating lever the gear 34 is permitted to move, curtain #2 is released, and its winding roller automatically closes the exposure.

It will be understood that in all exposures other than the bulb exposure, the dial pin 41 passes by the cam detents 50', which, with detent 50, is held out of engagement with the shutter gear 34 of the #2 curtain of the shutter.

The automatically operated focusing mirror 43 which is located in the light chamber A, when in focusing position, is interposed between the shutter and the lens as indicated in Figure 4, in line with the optical axis of the lens and camera. By means of a spring S, when the mirror is free to swing, it is swung from focusing position to picture-taking position in a plane approximately parallel with the axis of the lens, to close the chamber A against light rays entering from the top of the chamber.

The mirror is automatically swung into focusing position as the knob 16 is turned to wind the film and set the shutter for an exposure. Before the shutter is released however, the mirror must be removed from focusing position to picture-taking position and out of line with the optical axis of the camera.

The focusing mirror is hinged at 52 on the rear wall of the light chamber, and a cushioned stop 53 is hinged within the front portion of the chamber in the path of the free end of the upswinging mirror, the hinge 54 being employed to permit the cushion stop to swing to the rear out of the path of the lens when the latter is retracted within the light chamber.

As indicated in Figure 4 the ground glass plate or screen 1 is fixed and supported in the body of the camera above the light chamber A and in a plane parallel with the optical axis of the camera. The image or object to be photographed is reflected from the mirror 43 to this focusing screen or ground glass plate, and the image may be observed distinctly and clearly outlined in the glass screen.

In Figures 2, 4, 7, it will be noted that the focusing mirror near its hinge 52 is engaged by a pin or detent 55 that extends through an arcuate slot in a side wall of the light chamber A, and this detent bears at all times against the lateral edge of the mirror and urges the mirror toward its focusing position against the tension of its spring S.

The detent-pin is rigidly mounted on one side of an oscillatable, or rotary, plate 56, which is pivoted at 57 on the wall of the light chamber, exterior thereof. Another, oppositely extending pin 58 is fixed on the other side of the plate 56, and this latter pin engages a flange 59 integral with a spring-lever 60, which lever is pivoted at 61 on the underside of a frame plate I, to swing in a plane at right angles to the plane of oscillation of the plate 56, adjacent the rotary shaft 36 and between said shaft and the operating lever 44.

The lever 60 is fashioned with a catch or cam-hook 62 that is located in the path of movement of a rotary locking lug 63 fixed on the rotatable gear shaft 36, and a stationary stop lug 64 on the plate I limits the rotation of the shaft to one revolution. As seen in Figure 7 the catch lever or latch 62 and lug 63 are holding the shaft 36 against rotation, and thereby preventing release of the shutter while the focusing mirror 43 is in focusing position and the mirror is held in that position by the detent-pin 55.

The mirror is swung to its focusing position by rotation of the gear shaft 36, as the knob 16 is turned clockwise for that purpose, through the engagement of a lug 64 on the shaft 36 with a lug 65 rigid with the oscillatable plate 56, which lug or flange is located in the path of rotary movement of the lug 64 on the shaft 36. This engagement of the lug 64 and flange 65 causes the oscillation of the rotary plate 56 and the plate swings on its pivot 54, and then the engagement of the pin 55 of the oscillatable plates with the edge of the focusing mirror 43 causes the latter to swing to focusing position.

When the mirror has been swung to focusing position, it is caught by means of a retaining lug 65 which projects through a hole in a side wall of the chamber A and engages the face of the mirror at an adjoining lateral edge. This lug 65 is mounted on the free end of a spring blade 66 which is secured at its other end by screw 67 to the side wall of the light chamber, but exterior of the chamber.

To release the mirror from its focusing position, the spring blade 66 is flexed and its lug 65 is disengaged or withdrawn from contact with the edge of the mirror, the lug being retracted through the hole in the side wall of the chamber. For the purpose of flexing the blade I employ an L-shaped spring-actuated cam-lever 68 (Figs. 8 and 9), which is pivoted at 69 and located between the wall of the chamber A and the spring blade 66. The cam lever has a cam face 70 of suitable shape in contact with the underside of the spring blade, and a long lever arm 71 of this lever projects at its end upwardly through a slot in a frame plate I. This long arm of the cam lever is fashioned with a flange 72 which is located in the path of movement of one end of the operating lever 44, as indicated in Figure 9. Thus, at the initial pressure against the operating lever 44 and by its initial movement, the lever frees the mirror 43 from the detaining pin 65; spring S of the mirror swings the latter out of focusing position; the oscillatable plate 56 is swung on its pivot 57; detent-pin 55 in contact with the mirror is actuated thereby to swing the catch 60, and the shaft 36 is free to turn and thus permit the release action of the shutter.

The line of vision is indicated by the arrows in Figures 4 and 14, as passing through the open section of the rear wall of the unfolded hood, and perfect focusing is effected with the image on the ground glass screen I. The entire back wall of the hood may be turned down to give a clear vision of the mirror H' when the finger is employed at eye level.

For focusing the camera, a large milled ring, or non-traveling nut 73 is turned clockwise within the flange ring 74, and the barrel 75 of the lens mount which is threaded in and supported by the nut, is shifted outwardly to project the mount from the chamber A, and the lens may thus be focused to infinity. To focus nearer objects the milled nut 73 is turned to project the lens mount further, as in Figure 4.

The bushing or barrel 75 is not rotatable, but it is longitudinally reciprocable through the coaction of the internal threads on the non-traveling nut and the exterior threads of the traveling barrel. This traveling but non-rotary barrel or carrier at its outer end is also threaded internally, as at 76, to receive the lens 77 which has exterior threads 78.

To prevent accidental or inadvertent picture taking when the lens is in non-focusing position, the operating lever 44 is retained against swinging movement on its pivot 45, and therefore the picture cannot be taken, or the exposure made until and unless the operating lever is swung on its pivot in manner heretofore explained.

To thus lock the operating lever 44 I utilize the focusing mirror 43 when in focusing position, together with control means on the barrel or lens-carrier, which control means is shown as a pin 79 fixed on a tongue 80, and the tongue extends longitudinally from the inner end of the barrel or lens-carrier, at the bottom portion of the carrier.

This downwardly projecting pin 79 is adapted to move back and forth with the lens-carrier, and the pin is guided in its movement by a slotted yoke 81 rigid with the front wall of the light chamber A, which wall has the usual front circular opening back of the lens.

The control pin is directly over, is in contact with, and rides longitudinally on the top of an L-shaped arm 82 which is rigidly and transversely mounted on a rock shaft 83 that is located in the front portion of the bottom of the light chamber A, and extends laterally of the camera, with bearings 84 in the spaced side walls of the light chamber.

One end of the rock shaft projects through the chamber wall, and exterior of the chamber a safety latch 85 is rigidly mounted on the end of the rock shaft, and a spring 86 is coiled on the end of the shaft with one end of the spring engaging a pin 87 on the latch, and the other end of the spring anchored at 88 to one of the frame plates I.

As seen in Figures 8 and 9, the latch 85 is held by the spring 86 in position with its free end under a lug 89 on the L-shaped cam lever 68, and therefore this lever cannot be turned on its pivot 69, nor can the detent 65 be withdrawn from the retaining position in engagement with the lateral edge of the mirror 43, and consequently the mirror cannot be released.

When the non-traveling nut 73 is turned clockwise to project the lens for focusing, the lens-carrier is projected; the pin 79 rides outwardly on the arm 82 to depress said arm and thereby rock the shaft 83, thus withdrawing the free end of the latch from beneath lug 81, and this rocking movement of the shaft swings the latch to dotted position in Figure 8 against the tension of spring 86, and the latch is thus held in the dotted position.

The cam lever is now free to be operated to release the focusing mirror 43, and the latter may automatically be swung from focusing position to picture-taking position.

When the lens is retracted, the pin 79 rides inwardly on the depressible or rocking pin and then the spring 86 is free to swing the latch to holding position beneath the lug 81 as in Figures 8 and 9.

In Figures 14, 15, 16, 17, the cam lever 90 with its cam 70 is combined with the operating lever 44 as a single unit, and the push flange 46 is integral with this unit which is pivoted at 69 outside the light chamber A. The cam 70 rides under the spring blade 66 to withdraw the detent 65 from the mirror 43 as in the previously described camera.

In the form of camera of Figure 14, however, the hinged unfolding cover 2 of the unfolding hood H, is utilized to unlatch the operating lever so that it may be swung on its pivot or depressed by pressure applied to the flange 46, or in other suitable manner.

This operating lever is fashioned with a socket 90 in its upper headed end, and a latch 91 is pivoted at 92 on the hood cover 2. This latch depends from the cover and normally falls by gravity with its free end in the socket 90 of the operating lever to prevent swinging of the combined operating lever and cam lever on the pivot 69, a lug 93 being provided on the casing of the camera to guide the latch.

When the catch 5 of the unfolding hood is released, the spring actuated cover 2 is swung to dotted position of Figure 14, and this swinging movement of the cover on its pivot lifts the lower free end of the latch 91 out of its socket 90, thereby freeing the combined operating lever and cam lever, so that pressure on the button B will withdraw detent 65 from the mirror 43.

The normal operation of the camera is as follows:—Assuming that the camera has been loaded with film in the usual manner, in carrying position the viewing hood H is closed and the lens mount 77 is in retracted position. Preparatory to taking a picture, the viewing hood H is opened by depressing the spring detent 5, the sections of the hood being automatically opened by action of the springs attached thereto. The ring 73 is then rotated to project the lens mount and while viewing the object on the ground glass screen 1, the ring 73 is rotated further until the object is shown clearly on the screen and the camera is in focus.

The time of the exposure and the diaphragm stop being previously determined are set, respectively by the disk 37 and the diaphragm ring.

The camera is now in picture-taking-position and to take a picture, the button B is depressed whereupon the mirror 43 rises, and the shutters 8 and 9 are released at the predetermined speed.

To set the shutters and to bring the next unexposed portion of the film into position, the knob 16 is rotated, manually, in a clockwise direction, until the film is properly positioned as indicated by the usual means.

The lens is then retracted by rotating the ring 23 in the direction opposite to that employed to project the lens, and the viewing hood is folded down and latched in position by the spring detent 5.

Having thus fully described my invention what I claim as new and desire to secure by Letters Patent is:—

1. A reflex camera including a casing, a shutter and operating means therefor, a longitudinally movable cylinder threadedly mounted in said casing and a lens supported in the cylinder and having a non-focusing position, a mirror pivotally mounted in the casing and spring means urging said mirror to picture-taking position, and means co-acting with said cylinder and said operating means for retaining said first mentioned means inoperative until said lens is moved to focusing position.

2. A reflex camera including a casing, a shutter and operating means therefor, an adjustable lens movable along its optical axis to focusing position and a non-focusing position, and means controlled by the position of said lens for retaining said first mentioned means inoperative until said lens is moved to focusing position.

3. A reflex camera having visual focusing means including a lens movable along its optical axis, a shutter and operating means therefor, and means co-acting with the visual focusing means for holding the operating means inactive when said focusing means is in non-focusing position.

4. The combination in a reflex camera with a casing, a shutter, and operating means for the shutter, of focusing means alternately movable along the optical axis to focusing and picture-taking positions, and means co-acting with the focusing means for rendering said operating means inoperative when said focusing means is in non-picture taking position.

5. The combination in a reflex camera with a shutter and operating means therefor, a focusing mirror, means co-acting with said operating means for moving the mirror to focusing position, means for releasing the mirror, and automatic means for moving the mirror to non-focusing position, of means co-acting with the operating means for retaining the mirror in focusing position, another movable focusing element of the camera, and means under control of said focusing element for releasing the co-acting means whereby the mirror is rendered operative for removal to non-focusing position.

6. The combination in a reflex camera with a shutter and operating means therefor, a film-roll, means for simultaneously feeding the roll and setting the shutter, a focusing mirror and means co-acting with the setting-means for moving said mirror to focusing position, automatic means for moving the mirror to picture taking position, and means for releasing the mirror, of another movable focusing element, and holding means co-acting with the mirror-releasing means and said movable focusing element for retaining the mirror in focusing position.

7. In a reflex camera, the combination with film-feeding and shutter-setting mechanism, operating means for the shutter-setting mechanism, a hinged mirror, means co-acting with the setting-mechanism to swing the mirror to focusing position and means co-acting with said operating means to release said mirror, and automatic means for swinging the released mirror to picture-taking position, of a movable focusing element, means for retaining the operating means when the mirror is in focusing position, and means under control of the focusing element for releasing said retaining means.

8. In a reflex camera, the combination with a hinged focusing mirror, means for swinging said mirror to focusing position, means for retaining the mirror in focusing position, release means for the mirror, and means for automatically swinging the released mirror to non-picture taking position, of a movable lens-carrier, mirror releasing means, and means under control of the lens-carrier for detaining said mirror releasing means while the mirror is in focusing position.

9. In a reflex camera the combination with a hinged focusing mirror, means for swinging said mirror to focusing position and retaining means therefor, means for releasing the retaining means, and automatic means for swinging the released mirror to picture-taking position, of a movable lens-carrier, a latch-device for the releasing means, and means under control of the lens-carrier for releasing said latch-device.

10. In a reflex camera, the combination with a hinged focusing mirror, means for swinging said mirror to focusing position and retaining means therefor, means for releasing the retaining means, and automatic means for swinging the released mirror to picture-taking position, of a movable lens-carrier having a control pin thereon, a rock-shaft having a rock arm for co-action with the pin, and a spring actuated latch on said shaft for engagement with said releasing means.

11. In a reflex camera, the combination with a hinged focusing mirror, means for swinging said mirror to focusing position and retaining means therefor, means for releasing the retaining means, and automatic means for swinging the released mirror to picture-taking position, of a movable lens-carrier having external threads, a non-traveling nut mounted on the camera for moving the lens carrier, a control pin mounted on the carrier, a rock-shaft having a rock arm for co-action with said pin, and a spring-actuated latch on said shaft for engagement with said releasing means.

12. A reflex camera including a casing, a lens mounted with the casing having a non-focusing position and movable longitudinally along its optical axis to focusing position, a mirror pivotally mounted in said casing, and means controlled by the longitudinal position of said lens for retaining said mirror in image-reflecting position until said lens is moved longitudinally to and arrives at, focusing position.

13. A reflex camera including a casing, a cylinder threadedly mounted on said casing and a lens supported by said cylinder having a non-focusing position and movable along its optical axis to focusing position, a mirror pivotally mounted in the casing and spring means urging said mirror to picture-taking position, and means co-acting with said cylinder and mirror for retaining said mirror in non-picture-taking position until said lens is moved to and arrives at, focusing position.

14. A reflex camera including a casing, shutter, and operating means therefor including a pivotally mounted actuating lever, a longitudinally movable cylinder threadedly mounted in said casing and a lens supported by the cylinder and having a non-focusing position, a mirror pivotally mounted in the casing and spring means urging said mirror to picture-taking position, and means co-acting with said cylinder and said actuating lever for retaining said lever inoperative when said lens is in non-focusing position.

15. A reflex camera including a casing, shutter, and operating means therefor including a T-shaped actuating lever pivotally mounted in said casing, a longitudinally movable cylinder threadedly mounted in said casing and a lens supported by the cylinder and having a non-focusing position, a mirror pivotally mounted in the casing and spring means urging said mirror to picture-taking position, and means co-acting with said cylinder and said actuating lever for retaining said lever inoperative when said lens is in non-focusing position.

16. A reflex camera including a casing, shutter, and operating means therefor including a T-shaped actuating lever pivotally mounted in said casing and having a lug thereon, a longitudinally movable cylinder threadedly mounted in said casing and a lens supported by the cylinder and having a non-focusing position, a mirror pivotally mounted in the casing and spring means urging said mirror to picture-taking position, and means co-acting with said cylinder and said lug for retaining said lever inoperative when said lens is in non-focusing position.

17. A reflex camera including a casing, shutter, and operating means therefor including a T-shaped actuating lever pivotally mounted in said casing and having a lug thereon, a longitudinally movable cylinder threadedly mounted in said casing and a lens supported by the cylinder and having a non-focusing position, and means including a latch co-acting with said cylinder and said lug for retaining said lever inoperative when said lens is in non-focusing position.

18. A reflex camera including a casing, shutter, and operating means therefor including a T-shaped actuating lever pivotally mounted in said casing and having a lug thereon, a longitudinally movable cylinder threadedly mounted in said casing and a lens supported by the cylinder and having a non-focusing position, and means including a spring-pressed latch co-acting with said cylinder and lug for retaining said lever inoperative when said lens is in non-focusing position.

19. A reflex camera having visual focusing means including a lens movable along its optical axis, a shutter and operating means therefor including a pivotally mounted actuating lever, and means co-acting with said visual focusing means for holding the actuating lever inoperative when said focusing means is in non-focusing position.

20. A reflex camera having visual focusing means including a lens movable along its optical axis, a shutter and operating means therefor including a T-shaped actuating lever pivotally mounted in said casing, and means co-acting with said visual focusing means for holding the actuating lever inoperative when said focusing means is in non-focusing position.

21. A reflex camera having visual focusing means including a lens movable along its optical axis, a shutter and operating means therefor including a pivotally mounted actuating lever having a lug thereon, and means co-acting with said visual focusing means and said lug for holding the actuating lever inoperative when said focusing means is in non-focusing position.

22. A reflex camera having visual focusing means, and including a casing, shutter, and operating means therefor including an actuating lever pivotally mounted in the casing, and having a slot therethrough, and means co-acting with said visual focusing means and engaging said slot to render said actuating lever inoperative when said visual focusing means is in non-focusing position.

23. A reflex camera having visual focusing means, and including a casing, shutter, and operating means therefor, including an actuating lever pivotally mounted in the casing and having a slot therethrough, and a latch secured to said visual focusing means and adapted to engage said slot to render said actuating lever inoperative when said visual focusing means is in non-focusing position.

24. A reflex camera having visual focusing means, and including a casing, shutter, and operating means therefor including an actuating lever pivotally mounted in the casing and having a slot therethrough, and a latch pivotally mounted on said visual focusing means and adapted to engage said slot to render said actuating lever inoperative when said visual focusing means is in non-focusing position.

25. A reflex camera having visual focusing means including a ground glass screen and a viewing hood therefor, a shutter and operating means therefor including a pivotally mounted actuating lever having a slot therethrough, and a latch depending from said hood adapted to engage said slot to render said actuating lever inoperative when said visual focusing means is in non-focusing position.

KARL NÜCHTERLEIN.